United States Patent
Wilcoxson et al.

(10) Patent No.: US 9,485,780 B2
(45) Date of Patent: Nov. 1, 2016

(54) CYCLICAL OBSTRUCTION COMMUNICATION SYSTEM

(71) Applicant: ViaSat, Inc., Carlsbad, CA (US)

(72) Inventors: Donald Wilcoxson, Carlsbad, CA (US);
John O'Neill, Carlsbad, CA (US);
Daniel Chester, Carlsbad, CA (US);
Brian Sleight, Carlsbad, CA (US);
Changping Li, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

(21) Appl. No.: 14/986,197

(22) Filed: Dec. 31, 2015

(65) Prior Publication Data

US 2016/0198488 A1    Jul. 7, 2016

Related U.S. Application Data

(63) Continuation of application No. 14/610,679, filed on Jan. 30, 2015, now Pat. No. 9,258,054, which is a continuation-in-part of application No. 13/540,541, filed on Jul. 2, 2012, now Pat. No. 8,976,727, which (Continued)

(51) Int. Cl.
*H04L 1/00* (2006.01)
*H04W 72/12* (2009.01)
(Continued)

(52) U.S. Cl.
CPC ............ *H04W 72/1257* (2013.01); *H04L 1/08* (2013.01); *H04W 76/02* (2013.01)

(58) Field of Classification Search
CPC .. H04W 72/1257; H04W 76/02; H04L 1/08; H04L 1/0009; H04L 1/0051; H04L 1/0002; H04L 1/0034; H04B 7/18586; H04B 7/18506

USPC ............................................. 370/329
See application file for complete search history.

(56) References Cited

U.S. PATENT DOCUMENTS

| | | | |
|---|---|---|---|
| 6,901,242 B2 * | 5/2005 | Kroeger | H04B 7/12 455/296 |
| 6,944,139 B1 | 9/2005 | Campanella | |

(Continued)

FOREIGN PATENT DOCUMENTS

| | | |
|---|---|---|
| EP | 2100390 B1 | 4/2011 |
| EP | 2424127 A2 | 2/2012 |

(Continued)

OTHER PUBLICATIONS

ISA/EPO, International Search Report and Written Opinion, International App. No. PCT/US2007/082120, Feb. 20, 2009, European Patent Office, 11 pgs.

(Continued)

*Primary Examiner* — Afsar M Qureshi
(74) *Attorney, Agent, or Firm* — Holland & Hart LLP

(57) ABSTRACT

Techniques for improving data rates at mobile terminals that are subject to periodic channel interruptions in a beyond-line-of-sight communication system are disclosed, including improved encoding and decoding systems that identify blockages and modify receiver operation during blockages to reduce data errors. In certain embodiments, encoding, symbol mapping, interleaving, and use of unique periodic identifiers function to enable a series of packets that may be received in a blockage impaired channel with reduced errors.

19 Claims, 11 Drawing Sheets

Related U.S. Application Data is a continuation-in-part of application No. 12/446,170, filed as application No. PCT/US2007/082120 on Oct. 22, 2007, now Pat. No. 8,238,284.

(60) Provisional application No. 60/862,452, filed on Oct. 22, 2006.

(51) Int. Cl.
*H04L 1/08* (2006.01)
*H04W 76/02* (2009.01)

(56) References Cited

U.S. PATENT DOCUMENTS

| | | | |
|---|---|---|---|
| 6,956,814 B1 * | 10/2005 | Campanella | H04B 7/18534 370/210 |
| 6,996,164 B1 | 2/2006 | Blount | |
| 7,912,156 B1 * | 3/2011 | Hall | H03M 13/2906 375/278 |
| 8,238,284 B2 | 8/2012 | Wilcoxson et al. | |
| 2001/0047503 A1 * | 11/2001 | Zhang | H04L 1/0625 714/784 |
| 2004/0120276 A1 | 6/2004 | Golla et al. | |
| 2007/0286291 A1 * | 12/2007 | Lee | H04N 21/4425 375/240.27 |
| 2010/0128660 A1 * | 5/2010 | Becker | H04B 7/18582 370/316 |
| 2010/0322150 A1 | 12/2010 | Wilcoxson et al. | |

FOREIGN PATENT DOCUMENTS

| | | |
|---|---|---|
| JP | 2007022993 A | 1/1995 |
| JP | 2000236291 A | 8/2000 |
| JP | 2002330092 A | 11/2002 |
| JP | 2003169010 A | 6/2003 |
| JP | 2004235845 A | 8/2004 |
| WO | WO-2008115289 A3 | 9/2008 |

OTHER PUBLICATIONS

ISA/EPO, International Preliminary Report on Patentability, International App. No.PCT/US2007/082120, May 20, 2009, European Patent Office, 8 pgs.

Abramson, N., Internet Access Using VSATs, IEEE Communications Magazine, vol. 38, pp. 60-68, Jul. 2000.

Benarroch, A., Signal Statistics Obtained from a LMSS Experiment in Europe with the MARECS Satellite, IEEE Transactions on Communications, vol. 42, No. 2/3/4, Feb./Mar./Apr. 1994, pp. 1264-1268.

Cerasoli, C., Ka-band Sitcom in A2C2SS, Proc. IEEE MILCOM, 2004, Oct. 31, 2004, pp. 370-376.

Chujo, W., Helicopter Satellite Communication System for Disaster Control Operations, The 6th Asia-Pacific Seminar on Next Generation Mobile Communications 2005, Jan. 2005, slideshow presentation, pp. 1-30.

Farazian, K. et al., Development of Low-cost Satellite Communications System for Helicopters and General Aviation, Jet Propulsion Laboratory, Mar. 1994, 17 pgs.

Federal Communications Commission, 47 C.F.R. §§ 25.134, Oct. 1, 2002, pp. 285-286.

Federal Communications Commission, 47 C.F.R. §§ 25.209, Oct. 1, 2002, pp. 330-331.

Federal Communications Commission, 47 C.F.R. §§ 25.211-212, Oct. 1, 2002, pp. 333-334.

Heissler, J. et al., A Performance Analysis on the Application of Commercial Standards for IP Sitcom Modems, Proc. IEEE MILCOM, Oct. 17-20, 2005, Paper No. 148, pp. 1-7.

Li, H-B. et al., Ku-band Helicopter Satellite Communications for on Scene Disaster Information Transmission, 15th IEEE International Symposium on Personal, Indoor and Mobile Radio Communications, 2004, PIMRC 2004, vol. 4, pp. 2792-2796, Sep. 2004.

Miller, M. et al., Two-way Global Broadcast System Architecture, Proc. IEEE MILCOM, Oct. 2003, pp. 255-260.

Pateros, C., Novel Direct Sequence Spread Spectrum Multiple Access technique, Proc. IEEE MILCOM, 2005, Oct. 2000, pp. 564-568.

Wilcoxson, D. et al., Ku-band SATCOM On-the-move Network, Proc. IEEE MILCOM, Oct. 17-20, 2005.

* cited by examiner

CYCLICAL OBSTRUCTION COMMUNICATION SYSTEM

CROSS REFERENCES

This application claims the benefit of and is a continuation of U.S. patent application Ser. No. 14/610,679 filed on Jan. 30, 2015, which is a continuation of U.S. patent application Ser. No. 13/540,541 filed on Jul. 2, 2012, which is a continuation-in-part (CIP) of U.S. patent application Ser. No. 12/446,170 filed on Apr. 17, 2009, which is a U.S. National Phase Application of PCT/US2007/080720, filed Oct. 22, 2007, which in turn claims priority of U.S. Provisional Application Ser. No. 60/862,452 filed on Oct. 22, 2006, all of which are assigned to the assigner hereof and expressly incorporated herein by reference for all purposes.

BACKGROUND

The present invention relates generally to satellite communications and, more specifically, to a beyond line of sight (BLOS) communication system in which mobile terminals can experience channel blockage events.

Developments in broadband beyond line of sight communications have focused mainly on ground-mobile platforms and, to a lesser extent, on maritime vessels and fixed wing aircraft. For example, in recent years, there have been advances in precision tracking antenna technology. Some progress has also been made in the area of waveform construction and protocol performance for the ground-mobile environment.

Advances relating to rotary-wing aircraft and other platforms that experience occlusions have been conspicuously absent. Helicopter communications, for example, can experience periodic outages such as when the rotor blades block the antenna, or when the orientation of the aircraft changes relative to a communications satellite. Rail communications may experience interruptions due to trellises or other overhead structures.

As a result, these platforms have been relegated to relatively low data rate systems such as UHF SATCOM (Ultra High Frequency Satellite Communications) and Inmarsat's L-band GAN (Global Access Network) service. Conventional systems such as these can only offer data rates of between 64-384 kbps and have thus failed to keep pace with the rapidly increasing demand for bandwidth required to support modem user applications.

SUMMARY

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
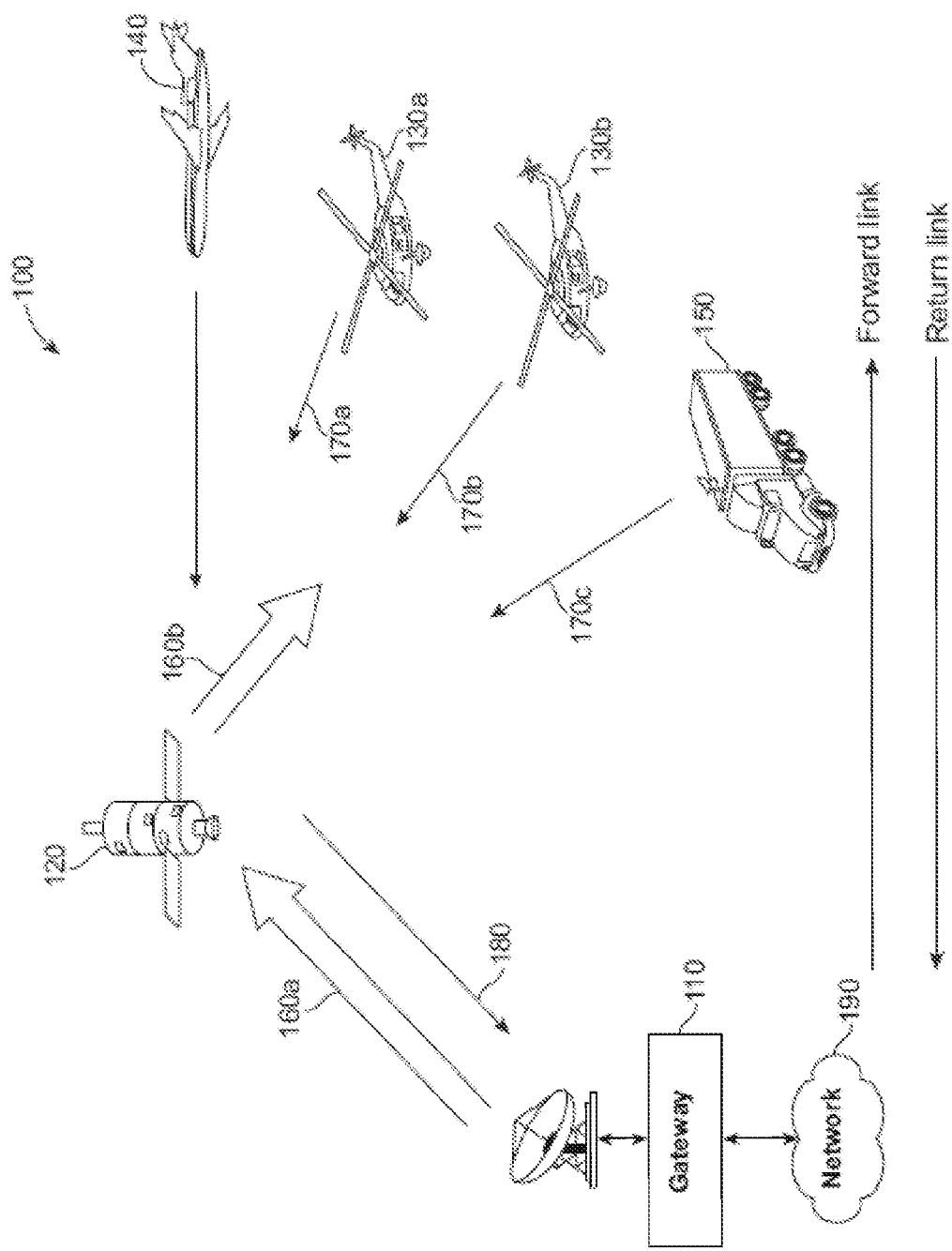
FIG. 1 is a high-level block diagram depicting a satellite communication system according to one embodiment of the present invention.

In the figures, similar components and/or features may have the same reference label. Further, various components of the same type may be distinguished by following the reference label by a dash and a second label. If only the first reference label is used in the specification, the description is applicable to any one of the similar components having the same first reference label.

DETAILED DESCRIPTION OF THE INVENTION

Satellite communications with rotary-wing aircraft such as helicopters can be benign, difficult, or very difficult depending on what operating frequency is contemplated. This is due to the relative electrical size of the rotor blade compared to the wavelength of the signal being used to transmit and receive to/from the helicopter. For example, at UHF, the wavelengths are long electrically compared to the rotor blade and thus significant diffraction of the signal occurs around the blade. As a result, only a very small degradation is experienced when the UHF antenna is placed beneath the rotor blades. It is therefore possible to use UHF systems on helicopters without significant, if any, modification to the waveform.

L-band is a higher operating frequency and has a correspondingly shorter wavelength. The rotor blade thus appears electrically larger, resulting in less diffraction and more of a "fade" when the blade passes over the antenna. This fade is typically on the order of several dB. Thus, it is still possible to operate an L-band system through rotor blades if enough margin exists in the link budget to "burn through" the fade. However, like UHF systems, L-band communications manage to achieve only limited data rates.

Fade depth grows with frequency. Beyond L-band, there becomes a point where sufficient link margin cannot be maintained (or it is too expensive or difficult) to simply burn through the fade. At Ku-band, for example, the fade caused by rotor blades has been measured to exceed 10 dB. Margin is not generally built into the link budget to accommodate this level of fade.

The structure of the rotor itself also has a tremendous effect on the amount of diffraction and thus the depth of the fade. However, rotor blades are designed primarily for flight safety and it is generally not possible to modify them for the purpose of improving communications. Therefore, under normal conditions, a satellite antenna mounted in the vicinity of rotor blades will experience significant blockages as the blades pass over it. Adding to the problem, antennas sized large enough to achieve true broadband data rates, yet small enough to be compatible with helicopter operation, are not generally available below Ku-band frequencies.

Depending on the orientation of the aircraft relative to the satellite, the outage encountered by the satellite terminal may vary percentage-wise from a few percent to twenty-five percent or more (ratio of blockage time to blockage period) at low elevation angles or extreme aircraft orientations. Outages of more than twenty-five percent can be considered effects similar to those encountered in the ground-mobile environment such as driving by trees and buildings, below overpasses, or parking behind obstructions. These extreme cases are likely to be encountered only for limited periods of time.

In addition, two-rotor aircraft will generally exhibit a lower blockage percentage than four (or more) rotor aircraft. While the blockage period is often consistent for a given aircraft, it can vary from aircraft to aircraft of the same make/model and can vary significantly between aircraft models. Some rotary-wing aircraft also exhibit varying periodicity of the blockage when maneuvering by upspeeding/downspeeding the rotor. Accordingly, as a general constraint, a Ku-band (or similar high frequency) communication system should accommodate periodic outages on the order of several percent to at least twenty-five percent.

FIG. 1 is a high-level block diagram depicting a satellite communication system 100 according to one embodiment of the present invention. As shown, satellite communication system 100 uses a hub-spoke topology in which a hub/gateway 110 communicates with a plurality of mobile terminals 130, 140, 150 via satellite 120. For convenience, the communication paths from gateway 110 to mobile terminals 130, 140, 150 will be referred to as forward links. Similarly, the communications paths from mobile terminals 130, 140, 150 to gateway 110 are described as return links. Accordingly, communication between gateway 110 and a particular mobile terminal 130, 140, 150 can be characterized in terms of its forward link, return link, or with reference to both directions.

Gateway 110 receives data packets for transmission to mobile terminals 130, 140, 150. As used herein, the term "packet" or "data packet" describes a unit of addressable data which can be sent or received within satellite communication system 100. Packets may be defined at the transport layer, at the network layer, or in accordance with a particular channel access protocol. For example, packets may include IP packets, HDLC (high-level data link control) frames, ATM (asynchronous transfer mode) cells, or units of data characterized by time and/or frequency slots such as in a multiple access system. Packets can also include sub-units. In particular, packets may describe sub-units produced by data fragmentation techniques. Packet addressing ("packetization") may be performed at the data source or, in some embodiments, by one or more processing layers of gateway 110.

As depicted in FIG. 1, gateway 110 is coupled to and receives packets from external network 190. Gateway 110 processes the packet data and sends it to its destination within communication system 100 via satellite 120. In the return direction, data from mobile terminals 130, 140, 150 is received at gateway 110 for delivery over network 190. Among other elements, gateway 110 includes hardware and software to detect and receive return link signals, provide forward link transmission, and manage network traffic. Network 190 can be a public network such as the Internet, or it may provide dedicated circuit backhauling into a private network.

Mobile terminals 130, 140, 150 are shown as including airborne as well as ground-based communication platforms. Mobile terminal 150 is vehicle-mounted such as can be used with a truck or rail transport. Mobile terminals 130, 140 are adapted for use with aircraft. For example, mobile terminal 140 can be used with a fixed-wing aircraft such as an airplane while mobile terminals 130a, 130b can be fitted to helicopters or other rotary-wing aircraft. Communication system 100 is therefore a heterogeneous system in that it is adapted for use with remote terminals which may be subject to periodic outages or other service interruptions as well as terminals that typically do not experience such outages. Although not shown, embodiments of satellite communication system 100 can include other communication platforms such as ship-based (maritime) terminals in addition to land-based terminals.

In some embodiments, mobile terminals 130, 140, 150 are classified by gateway 110 according to whether they are subject to periodic outages. Thus, for example, helicopters 130 may be classified as "obstructed" terminals due to the periodic blockages caused by their rotor blades. Airplane 140, on the other hand, may be classified as "non-obstructed" based upon its flight characteristics and the placement of its antenna. Vehicle 150 may be classified as either obstructed or non-obstructed according to circumstances. For example, a train with frequent blockages such as those caused by periodically spaced overhead electrical power trellises may be classified as "obstructed" whereas a truck operating in relatively open areas may be classified as "non-obstructed." The manner in which these classifications are used is discussed below.

Mobile platforms can include a satellite modem, a power distribution system, and baseband equipment such as TCP accelerators, routers, and encryption devices. Advantageously, from the user's standpoint, mobile terminals 130, 140, 150 may provide standard, cable modem-type network access and transparently support commercial and military software applications at true broadband data rates. With satellite communication system 100, obstructed terminals such as helicopters 130 communicate at broadband data rates without reducing the performance of non-obstructed terminals such as fixed-wing aircraft 140. In an exemplary embodiment, each mobile terminal includes a satellite modem incorporating ArcLight® technology from the ViaSat corporation of Carlsbad, Calif.

Satellite communication system 100 may utilize different waveforms for the forward and return links. In the presently described embodiment, gateway 110 generates a single, high-rate time-division multiplexed (TDM) signal 160a that is relayed by satellite 120 to all the serviced users in the forward direction. Mobile terminals 130, 140, 150 receive and demodulate the high-rate forward signal 160b to recover packet data addressed to them. Forward link 160 may employ a variety of modulation and pulse shaping techniques, including spread spectrum techniques. In an exemplary embodiment, forward link 160 is a Ku-band signal and supports information rates of up to 10 Mbps. Other forward link transmit waveforms are possible and may include, for example, channel access protocols such as TDMA (time-division multiple access) and MF-TDMA (multi-frequency time-division multiple access). With an MF-TDMA approach, gateway 110 may serve as a bandwidth manager and packets may be "addressed" based upon the particular time and frequency slot they occupy.

In an exemplary embodiment, mobile terminals 130, 140, 150 each transmit a CRMA (code-reuse multiple access) signal to satellite 120 on their respective return links 170. Satellite 120 relays a composite signal 180 (which may be the sum of all the CRMA signals 170 from the mobile terminals) back to gateway 110. With CRMA, each mobile terminal 130, 140, 150 decides locally when to transmit without requiring bandwidth assignment from gateway 110 or satellite 120. Thus, in some embodiments, the return link signals are locally-controlled asynchronous bursts generated by mobile terminals. Alternatively, TDM, TDMA, and MF-TDMA signals may be used on the return link.

Although depicted as having a hub-spoke architecture, persons of skill in the art will recognize that communication system 100 supports other architectures and network topologies. Also, while Ku-band transmission is believed to represent a good balance of data rates and antenna sizes while still achieving regulatory compliance, other operating frequencies are specifically contemplated for use with embodiments of the present invention. For example, among others, embodiments of the present invention may use commercial C-band, X-band, and Ka-band frequencies to achieve high data-rate communications in the presence of blockages.

A continuously transmitting waveform (such as forward link 160) may be subject to periodic blockages. For example, blockages can result when helicopter blades obstruct a satellite antenna. These periodic blockages result in large numbers of dropped packets and can also cause link tracking failures. Also, if not properly managed, periodic blockages can result in a catastrophic link loss such that a receiver is unable to reacquire the forward link signal even after the blockage has passed.

Unlike conventional approaches, embodiments of the present invention address these problems directly using a combination of inventive transmit and receive techniques. For clarity, the following discussion is provided from the standpoint of time-diversity implemented on the forward link. However, it will be recognized that time-diversity techniques may be advantageously used for the return link as well. For example, various embodiments of the present invention use time-diversity techniques on the return link at obstructed mobile terminals.

Time diversity in one embodiment involves transmitting a data packet at a first time and then transmitting the same data at a carefully selected second time. The second time can be determined based upon blockage characteristics detected either at the gateway or at the mobile terminal. For example, in one approach, a hub (such as gateway 110) monitors burst arrivals, burst timing, packet counts, and feedback signals from an obstructed terminal and forms an estimate of the blockage duration on the basis of such communication activity. The hub may track each terminal's communications (or communication patterns) over time and dynamically update the blockage parameters when changes are detected. In this way, the blockage estimate used to determine the second transmit time can be successively updated and improved.

Alternatively, blockage parameters can be measured at the mobile terminal and reported to the hub/gateway for use in timing the transmission of duplicate packets. For example, when an obstructed mobile terminal such as a helicopter establishes a connection with the hub, either during a login or as part of a handshake procedure, a delay value for time-diversity transmissions can be established. The obstructed terminal can provide information about the duration of its blockage period, the duration of the blockage event, and/or the duration of its open interval for use by the hub in determining the appropriate delay based upon prevailing conditions.

When a continuously transmitting forward link is utilized, the obstructed terminal (e.g., helicopter 130) can measure its blockage parameters based upon detecting the presence of the forward link signal and report them back to the hub/gateway (e.g., gateway 110). Other approaches to gathering data about the obstruction at the mobile terminal can include mechanical sensors, optical sensors, or other non-communications based techniques which measure the physical location of the helicopter blade relative to the satellite antenna. The obstructed terminal can send blockage data and additional relevant information such as flight characteristics of the aircraft, rotational speed of the rotor, number of rotor blades, etc. Based upon information from the mobile terminal, the gateway can determine the appropriate time-diversity delay for avoiding the periodic obstruction. Whether performed at the hub or at the mobile terminal, information gathering and reporting activities may be ongoing so that the blockage estimate remains up-to-date and reflects current operating conditions.

As provided in embodiments of the present invention, time-diversity is not a "blind" approach based simply upon repetitive data transmission. By contrast, embodiments of the present invention use intelligent time-diversity in which data transmission is carefully controlled according to blockage characteristics, prevailing conditions at the mobile terminal, and other factors bearing upon the mobile terminal's ability to receive a communication signal. Unlike blind time-diversity, the inventive approach reduces the effect of the obstruction while conserving scarce bandwidth resources.

In addition, embodiments of the present invention may utilize time-diversity without changing the physical layer waveform. Instead, an existing waveform can be used to carry one or more copies of the time-diversity data. A data-centric approach to time-diversity can advantageously be implemented without extensive equipment modification and, as discussed below, it can be used in a selective manner. Persons of skill in the art will recognize that physical-layer changes affect all communication terminals in the same manner and therefore can be expensive and inflexible.

Based upon empirical data, the inventors of the present invention have determined that blockages such as those experienced at helicopter-based terminals under normal operating conditions may vary up to about twenty-five percent. Extreme blockages can be considered to be effects similar to those encountered in the ground-mobile environment and are likely to prevail only for limited periods of time. Using time diversity techniques, however, embodiments of the present invention can support high data rate transmission into obstructed terminals with blockage ratios approaching 50% of the blockage period. Thus, time-diversity can be used to avoid a large number of blockage (or signal degradation) events.

Figure 2:
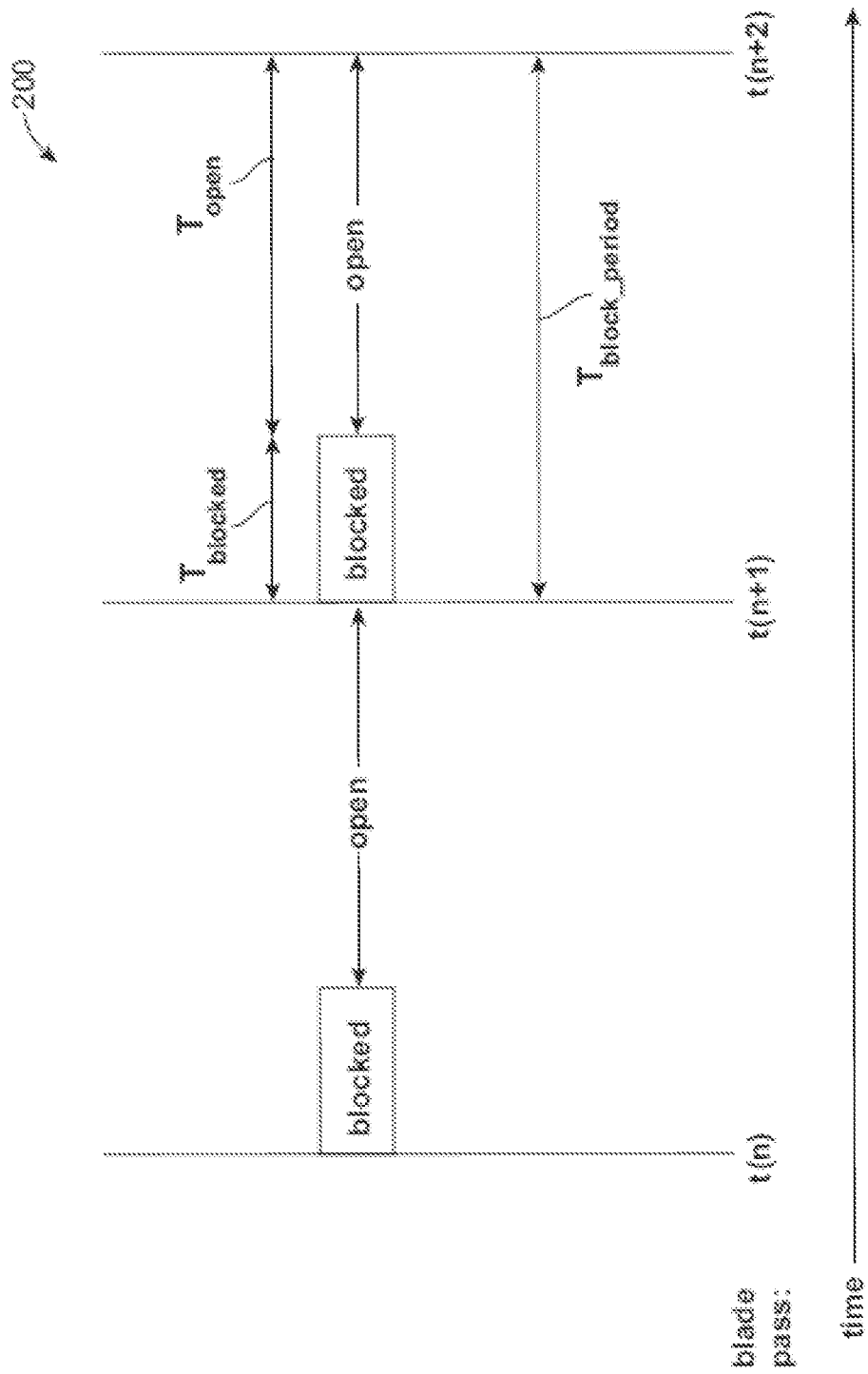
FIG. 2 is a diagram illustrating periodic blockage of a communication channel such as may be experienced by a rotary-wing aircraft.

FIG. 2 is a diagram illustrating blockage of a communication channel such as can be caused by the blades of a helicopter. As shown, time passes from left to right. At initial time t(n), the nth helicopter blade pass has just begun and the blade obstructs the helicopter antenna. The channel thus enters the blocked state at this time. After the blade has passed beyond the antenna, the channel enters the open (unblocked) state allowing communication signals to be transmitted and received. When the (n+1)th helicopter blade pass begins at time t(n+1), the channel again enters the blocked state. The time between the start of the initial and subsequent blade pass events is termed the blockage period and is labeled as $T_{block\_period}$. Similarly, the blockage duration is shown as $T_{blocked}$, and the open (unblocked) interval is denoted $T_{open}$.

Given the short-term stability of rotor passes and the relatively short blockage duration relative to the blockage period, a range of time-diversity delay values ($T_{delay}$) can be adopted. An exemplary range of time-diversity delay values is provided by the following expressions in which delay is measured from the time at which transmission of the original packet begins. These bounds can be readily appreciated with reference to FIG. 2.

$$T_{delay} > T_{product} + T_{blocked} + \Delta \quad\quad 1.$$

$$T_{delay} < T_{block\_period} - T_{packet} - T_{blocked} - \Delta \quad\quad 2.$$

where:

$T_{packet}$ represents the time required to transmit a data packet at a specified data rate $T_{block\_period}$ represents the period of the blockage event $T_{blocked}$ represents the duration of the channel blockage $\Delta$ represents the demodulator recovery time.

Time-diversity delay values can be set within the range defined by Expressions 1, 2. The first expression represents a minimum delay after which a duplicate packet should be transmitted to ensure that either the original packet or the duplicate packet will be received in the presence of the periodic blockage. Similarly, the second expression is an upper bound and establishes a maximum delay that will result in either the original or duplicate packet avoiding the periodic blockage with a minimum of delay, i.e. incorporating at most single blockage event. In accordance with the foregoing, it will be understood that the delay value can be increased by an integral number of blockage periods ($T_{delay} = T_{delay} + n*T_{block\_period}$) without deviating from the principles described herein.

The time required to transmit a packet of a given size ($T_{packet}$) varies according to the data rate of the communication system. In some cases, packet transmission time $T_{packet}$ can be conveniently set according to a maximum packet size parameter of the communication system. In addition, the demodulator recovery time ($\Delta$) is generally known, but can be set to a reasonable value determined according to the expected data rate and other relevant factors.

As an alternative to Expression 2, a delay value based upon a 50% blockage ratio can be used to establish the upper-bound of the delay value.

$$T_{delay} < T_{block\_period}/2 \quad\quad 3.$$

With this approach, $T_{delay}$ is set within the range defined by Expressions 1, 3. Expression 3, for example, may be useful in cases when the blockage period is known but other blockage parameters, such as the blockage duration, are not known. Alternatively, Expression 3 may be used an initial delay as more precise blockage data is acquired.

Following this approach, in an exemplary embodiment of the present invention, an obstructed terminal communicates the period of its blockage ($T_{block\_period}$) to the gateway when a communication session is established. The gateway establishes the initial time diversity delay value for the obstructed terminal within the range defined by Expressions 1, 3 above. Thereafter, the gateway may acquire new blockage data either from the obstructed terminal directly, or by monitoring the communication activity of the obstructed terminal and generating estimates of its relevant blockage characteristics. Using the new blockage data, the gateway may update the time-diversity delay used with the obstructed terminal. For example, as more blockage data is acquired, the new time-diversity delay value may be established using the range defined by Expressions 1, 2.

The time-diversity delay value can be used, for example, to set the depth of a delay buffer or the value of a programmable timer such that a duplicate packet is transmitted after its original packet by the delay value $T_{delay}$. This ensures that either the original or duplicate time-diversity packet avoids the periodic obstruction and arrives at its destination By ensuring that at least one time-diversity packet is received, sustained high data rate communications are possible notwithstanding the effect of the periodic obstruction. One exemplary embodiment of the present invention operates in the Ku-band and can achieve information rates of up to 10 Mbps to unobstructed terminals, and time-diversity rates of up to 5 Mbps into obstructed terminals.

Time-diversity can be implemented at the network layer or at the transport layer and can be performed in a brute-force or a selective manner. For example, if IP networking is used, time-diversity processing can be performed at the IP layer. Transport layer processing, among other possibilities, can include the marking and manipulation of HDLC frames. In addition, time-diversity can be applied to all or only some data packets. A brute-force approach transmits duplicate packets regardless of their destination. In other words, no distinction is made between obstructed and non-obstructed terminals. On the other hand, time-diversity can be advantageously applied such that only packets sent to/from obstructed terminals are duplicated and no duplicate processing is needed at the non-obstructed terminals.

Selective time-diversity can be implemented in heterogeneous networks at the IP layer in several ways. One approach is to classify incoming IP packets according to their destination. For example, a hub (such as gateway 110) can monitor the IP destination address field of each incoming packet. If the destination address corresponds to a terminal known to be obstructed, such as a helicopter, the incoming packet can be stored in an obstructed-group buffer. Alternatively, if the incoming packet is not destined for an obstructed terminal, it can be added to a non-obstructed buffer.

Next, a payload can be created by allocating a fixed percentage of each transmit burst for obstructed packets and filling the remainder with non-obstructed packets. The quantity of obstructed packets can be limited according to the percentage allocation. For example, 20% of the payload can be reserved for obstructed packets. In cases where the obstructed portion of the payload has been filled and there are insufficient non-obstructed packets to fill the remainder, additional obstructed packets can be added. Of course, if the portion allocated for obstructed packets is not filled, non-obstructed packets may be added. The percentage of the payload allocated to the two packet types can be a fixed value or dynamic based on IP traffic composition and/or effective over the air rate matching. Provision can also be made to provide a minimum percentage allocation to the two packet classifications to avoid starvation. In creating the payload, high priority packets (such as command, status/control, or those destined for priority-users) can be added before low priority packets. Quality of service markings, such as the IP DiffServ field, can also be utilized when assembling the payload to facilitate bandwidth management.

Some embodiments of the present invention transmit time diversity data in blocks. Each block typically comprises a group of IP packets destined for obstructed receivers in a first burst, followed by the same group of IP packets (duplicate packets) which are delayed and sent in a second burst. The delay can be determined based upon the periodic obstruction using the techniques previously disclosed and ensures that either the original or the duplicate packet is received at the obstructed destination. With selective time-diversity, packets destined for obstructed terminals are transmitted twice per block, whereas each burst in a block includes new data for non-obstructed terminals. In this way, the communication system can support a mixture of obstructed and non-obstructed terminals without a corresponding reduction in data rate for non-obstructed terminals.

Various approaches can be used to control the timing at which each burst is transmitted. For example, a counter can be used such that a burst of packets is transmitted at a predetermined bit count. Alternatively, a programmable timer can be used to interrupt a transmit processor and cause it to send a burst of packets. When using a timer, the duration of a burst cannot exceed the period of the timer. Thus, with this approach, the quantity of packet data (and therefore the size of the payload) that can be transmitted in a burst is determined by the timer period and the over-the-air data rate.

Figure 3:
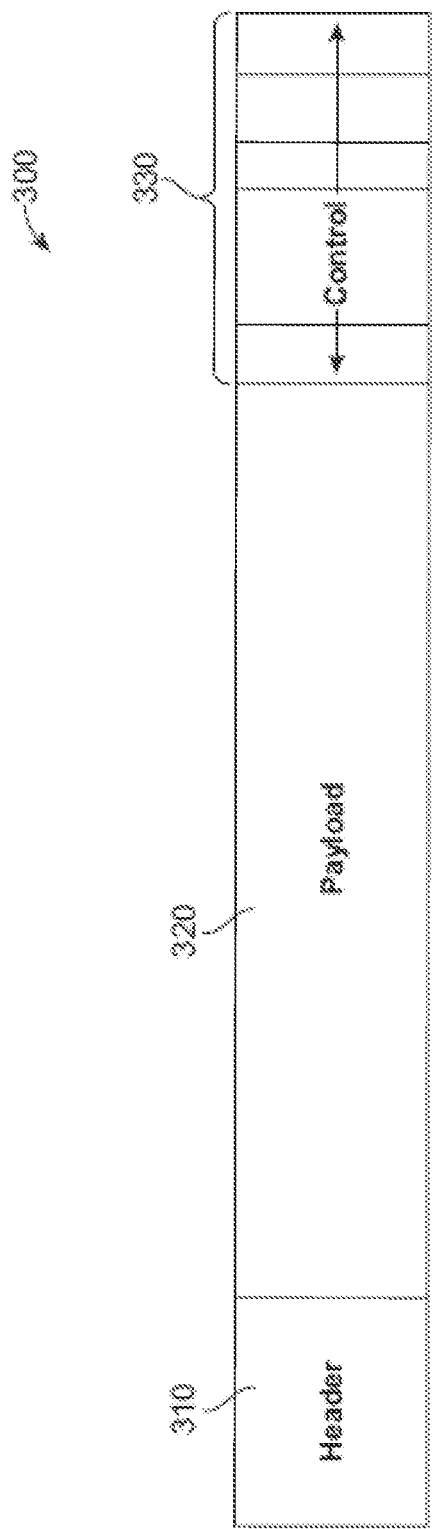
FIG. 3 is a block diagram of a data packet destined for an obstructed terminal according to one embodiment of the present invention.

FIG. 3 is a block diagram of a data packet 300 destined for an obstructed terminal according to one embodiment of the present invention. As shown, control information can be added to obstructed packets as part of time diversity processing to assist in packet reconstruction at the receiving terminal. Header 310 and payload 320 represent elements of a standard IP data packet. Control structure 330 can be appended to the data packet or encapsulated within the packet and can contain a variety of data fields useful for performing packet reconstruction. For example, in one embodiment, control structure 330 includes an obstructed/non-obstructed field, an original/duplicate field, a sequence identifier, a burst identifier, and one or more fragmentation flags. Thus, during time diversity processing, each obstructed packet is marked as either an original or a duplicate packet and is assigned appropriate identifiers.

Figure 4:
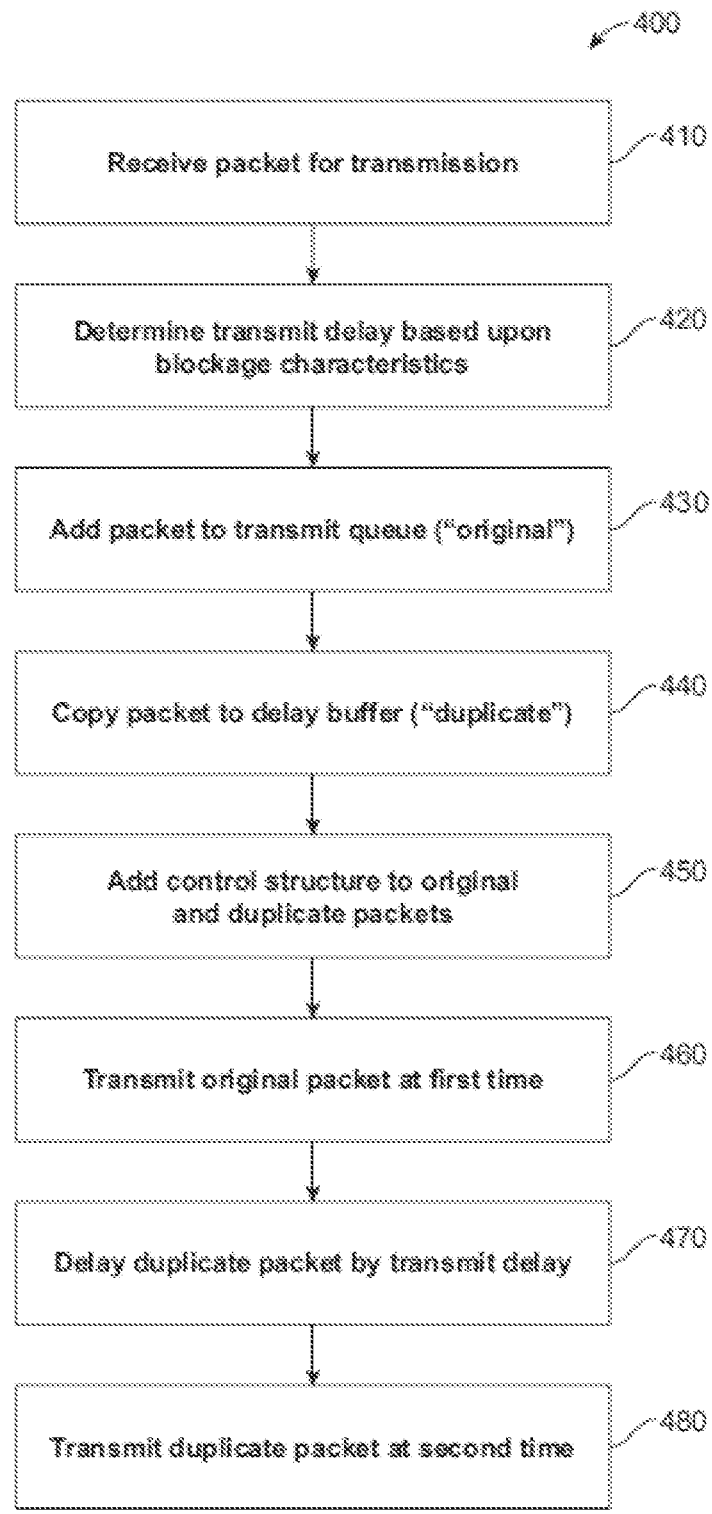
FIG. 4 is a flowchart showing forward link transmit processing according to one embodiment of the present invention.

FIG. 4 is a flowchart showing transmit-side processing 400 of time-diversity packets according to embodiments of the present invention. The processing steps shown represent a brute-force (non-selective) approach which can be implemented at either a gateway or a mobile terminal. Referring again to FIG. 1, it will be noted that time-diversity transmission can be used on the forward link, the return link, or both in satellite communication system 100 according to embodiments of the present invention. It will also be noted that time-diversity may be advantageously used with multiple access techniques such as TDMA or MF-TDMA. In an exemplary communication system, gateway 110 is configured for selective time-diversity transmission, obstructed terminals 130 are configured for brute force time-diversity transmission, and non-obstructed terminals 140, 150 do not utilize time-diversity on either the forward or return links.

In a first step 410, a packet is received for over-the-air transmission from the gateway or hub. The packet may be received from an external network such as the Internet for delivery to an obstructed mobile terminal such as helicopter 130. At step 420, a packet delay value is determined based upon blockage characteristics. As previously discussed, the delay value may be supplied to the gateway by a mobile terminal or inferred based upon a mobile terminal's communication patterns.

After being received, at step 430, the packet is placed into a transmit buffer. The transmit buffer stores a first copy ("original") of the data packet and may be organized in a variety of different ways to observe packet-priority or quality of service constraints within the communication system. In addition, a second copy of the packet ("duplicate") is added to a delay buffer 440 for transmission after the original packet. The delay buffer implements the transmit delay determined at step 420 to provide the appropriate time spacing between the original and duplicate packets based upon blockage characteristics.

Prior to transmission, a control structure is added to both the original and duplicate packets 450 to facilitate reconstruction by the receiver. The control structure includes an indication of whether the packet is an original or duplicate copy, and provides identifiers used for packet reconstruction. Identifiers, for example, may include a sequence identifier which provides a temporal sense of the packet relative to other packets in a burst transmission as well as a maximum count of the number of packets included. In some embodiments, a packet's position relative to other packets in the burst can be determined according the sequence identifier and its "membership" in a group of packets can be determined by its burst identifier. The receiver can use this information to identify a packet as the "next" packet in the receive sequence or as the "last" packet in a particular group. The receiver can also detect the arrival of a new group of packets using the identifiers. Packets with the same burst and sequence identifiers, for example, contain the same data.

The original packet is transmitted at a first time, step 460, before the duplicate packet. At step 470, the transmit delay is implemented. Thereafter, at step 480, the duplicate packet is transmitted at a second time following the delay. In this way, at least one of the original or duplicate packets will avoid the obstruction. Although these steps 410-480 generally describe the technique applied to the forward link portion of the link (160), they can also be applied to the return links 170 with minor changes. In particular, steps 410-480 may be advantageously used with time-division multiple access techniques as previously discussed.

Time-diversity at the IP level has limits with respect to the over the air data rate. Generally, the transmit time for the largest IP packet must fit within the limits set by the obstruction periodicity. For low OTA data rates and large packet sizes, time-diversity can be adjusted to accommodate these constraints. One approach involves IP fragmentation. In effect, large IP packets are broken up into a collection of fragments at the IP-stack level using standard IP fragmentation techniques. Alternatively, a second approach performs fragmentation after packets have left the IP stack and are ready to be transmitted. This avoids the problems of IP fragmentation where an active 'Do Not Fragment' IP control flag would prevent the IP stack from creating smaller packets. Post-IP stack fragmentation at the transmitter requires packet fragment reconstruction at the receiver before packets are passed to the receiver's IP stack. In both cases, fragmentation is configured to divide IP packets into smaller pieces (fragments) according to the over-the-air data rate and the "open" or unobstructed portion of the blockage period so that data transfer is optimized.

Figure 5:
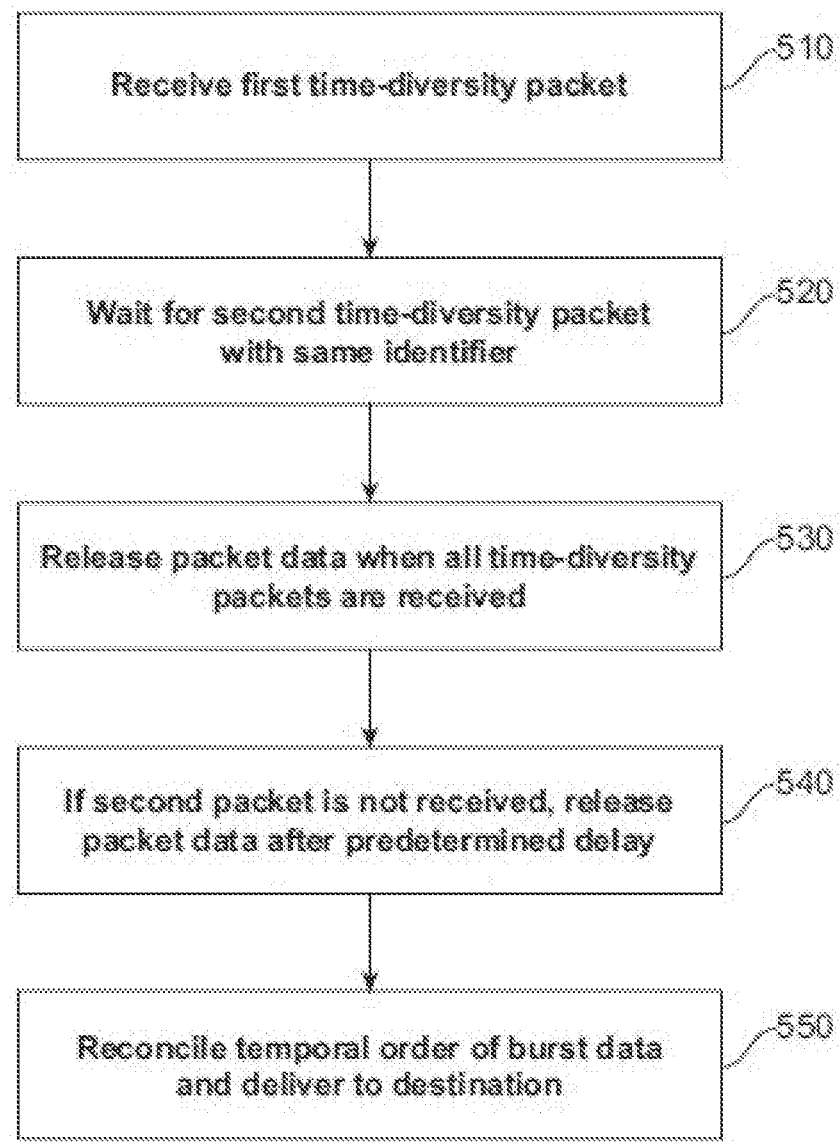
FIG. 5 is a flowchart showing forward link receive processing according to an embodiment of the present invention.

FIG. 5 is a flowchart showing receive-side processing 500 of time-diversity packets according to an embodiment of the present invention. Time diversity techniques present challenges for the receiver. One challenge is the possibility that more than one of the same packet may be received. In other words, both the original and the duplicate time diversity packet could be received. Thus, the receiver may have an ability to judge if two packets are related (as original and duplicate) and to track whether one or possibly both packets have been received. Additionally, the receiver may need to deal with packets which arrive out-of-order. The receive-side processing 500 has both of these features.

Processing begins at step 510 when a first time-diversity packet is received. This packet may be followed by other original/duplicate packets. At step 520, the receiver waits for the arrival of a duplicate packet corresponding to the first original/duplicate packet. For example, if the first packet is marked as an original packet, the receiver waits for the corresponding duplicate packet to arrive. If the first packet is marked as a duplicate, the receiver may not wait for additional related packets to arrive. In one embodiment, original and duplicate packet pairs are identified based upon packet control information such as a sequence identifier. Thus, for example, arriving packets may be stored in a buffer at a position determined by their respective sequence identifiers. The receiver then determines whether one copy of all packets having the same identifier have been received with reference to the buffer.

When one complete set of data packets is received, step 530, packet data can be released for further processing. For example, after receiving the last packet, the entire group of packets may be released for processing. However, the receiver does not wait indefinitely. If all the packets with the same identifier are not received within a maximum period of time then, at step 530, the packet data is released for processing. In some embodiments, the maximum wait is set according to the depth of a delay buffer. For example, buffer depth may be established when the communication session begins and then used to measure how long it should take for both packets to arrive. Alternatively, if packets in a new set are received before the old set is complete, packets in the old set may be either discarded or released for processing.

At step 550, data is released to the system in the correct temporal order. Following one approach, packet data is grouped according to a burst identifier included as part of the packet control information. Individual packets are assembled within the burst according to their respective sequence identifiers. When the entire burst has been received and assembled in the correct order, data can be released to the IP stack. Release of packet data can be metered to avoid IP stack congestion or overflow, and a timer can be configured to flush packets out of the buffer in the event of a defective block transfer.

Of course, receive-side processing can be extended to include IP fragmentation. In that case, as an additional processing task, the fragments are first assembled into packets. If standard IP fragmentation was used at the transmitter, then the fragments may be reassembled at the IP-stack level. Alternatively, if post-stack fragmentation was performed, packets are reassembled from the received fragments before delivery to the IP-stack. Control information such as fragmentation flags can aid in this process as known in the relevant art.

Accumulating an entire burst of data before releasing it to the system minimizes jitter. However, it does not minimize delay. Therefore, in some embodiments, packets are released to the system as soon as they are needed. With this approach, the "next" packet in a data stream is identified according to its sequence and burst identifiers. When a packet arrives, if it is the next packet, it is immediately released for processing. If the packet is not the next packet, it is stored in a receive buffer. Packets in the receive buffer are then read out of the buffer as they become the next packet. Subsequently received duplicate copies are discarded. In this way, packet data is presented to the system as soon as it becomes available and in the correct order. However, the tradeoff can be higher levels of jitter.

As an alternative to IP-layer processing, time-diversity can be implemented at the transport layer. Data frames, such as HDLC (high-level data link control) frames, are duplicated, delayed, and transmitted in generally the same manner as described for IP packets with appropriate hardware modifications for transport layer operations. As with IP-layer processing, time-diversity at the transport layer can be implemented in a selective or brute-force manner and uses blockage characteristics to overcome obstructions. Transport layer data frames are recovered and placed in the proper order before being released to the system as previously discussed.

Figure 6:
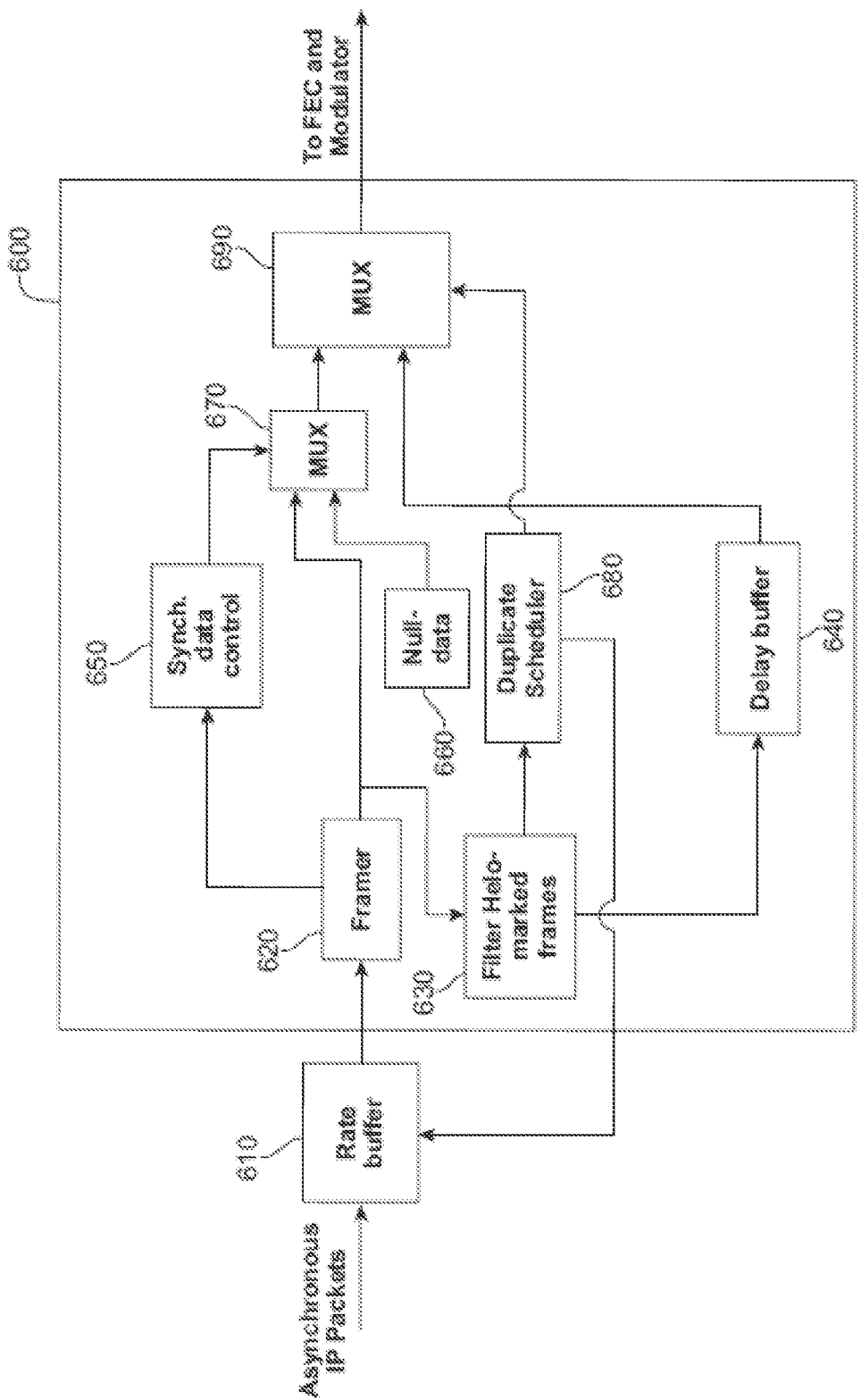
FIG. 6 is a block diagram of a transport processor according to one embodiment of the present invention.

FIG. 6 is a block diagram of a transport processor 600 such as can be used with embodiments of the present invention, including as part of gateway 110. As shown, IP data packets arrive asynchronously at a rate buffer 610 which provides an input to transport processor 600. At the output, packet and null data is transmitted in a synchronous stream of framed packets such as continuously transmitting forward link 160.

Rate buffer 610 provides the packets to framer 620 which assembles transport layer frames and adds appropriate control information. For example, framer 620 accepts IP packets and generates HDLC frames at its output. Time diversity HDLC frames are "marked" for duplication by adding appropriate control information. One output of framer 620 is coupled to synchronous control element 650 and asserts a signal when HDLC frames are ready to transmit. A second output of framer 620 is coupled with multiplexer 670. The output of synchronous control 650 forms the select input of multiplexer 670 such that available HDLC frames are output; otherwise, in their absence, null data is output. The null data is generated by element 660 and supplied at the second input of multiplexer 670.

Filter 630 is coupled to the output of framer 620 and is configured to copy marked data frames to delay buffer 640. In addition, filter 630 marks the data frames it copies to delay buffer 640 as duplicates by, for example, setting appropriate control information bits. In this way, delay buffer 640 receives and stores data frames output by framer 620 and which are marked both as duplicates and as obstructed.

The output of delay buffer 640 is coupled to a first input of multiplexer 690 and the second input of multiplexer 690 is coupled with the output of multiplexer 670. The output of multiplexer 690 forms the output of transport processor 600. Thus, in operation, multiplexer 690 supplies a synchronous stream including packet data (original or duplicate) and, when packet data is not available, null data.

Filter 630 also provides input to duplicate scheduler 680 which, in turn, controls the select input of multiplexer 690. When filter 630 processes a marked frame, it notifies duplicate scheduler 680. In response, duplicate scheduler 680 computes a future transport bit count at which the duplicate data frame will emerge from delay buffer 640. The transport bit count represents a time-diversity delay which will ensure that either the original or the duplicate data frame are received in the presence of the obstruction and is determined using one of the approaches previously discussed.

When the bit-counter reaches the computed value, duplicate scheduler 680 performs two actions. First, it temporarily disables the rate buffer 610 and framer 620 interface so that new IP datagrams are not received into the transport processor. Second, it causes multiplexer 690 to output the duplicate data frame by selecting at multiplexer 690 the input that is coupled to delay buffer 640. After the duplicate copy has been inserted into the transport stream, the rate buffer/framer interface is enabled and normal operation resumes. In this way, time-diversity processing at the transport layer is realized in the communication system.

Figure 7:
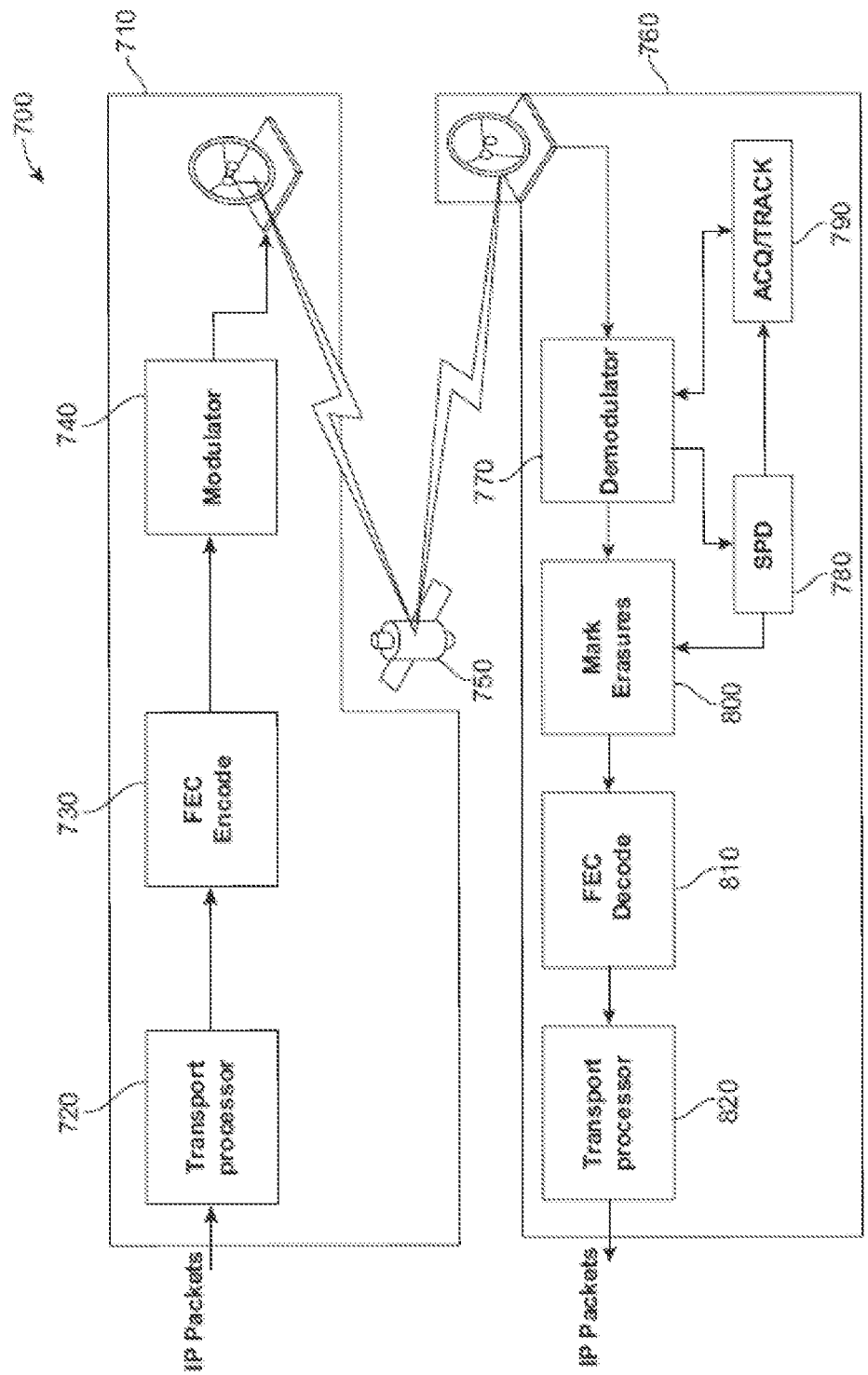
FIG. 7 is a block diagram of a satellite communication system according to one embodiment of the present invention.

FIG. 7 is a block diagram of a satellite communication system 700 according to one embodiment of the present invention. IP packets received at hub 710 are transmitted on the forward link to communication satellite 750 and from communication satellite 750 to mobile terminal 760.

Transport processor 720 receives incoming packets and prepares them for transmission. This may include, for example, framing the data at either the network or transport layers and scheduling burst transmissions as described in connection with transport processor 600. Forward Error Correction (FEC) encoder 730 is coupled with transport processor 720 and receives its output. In one embodiment, FEC encoder 730 uses parallel concatenated convolution encoding. However, as will be recognized by persons of skill in the art, other coding techniques are possible. Modulator 750 modulates a baseband signal with the channel bits and delivers it to a radio/antenna for over-the-air transmission to satellite 770.

At the receiver 760, the forward link signal is down-converted to a baseband signal. Periodically, receiver 760 is obstructed and loses signal tracking. The receiver employs a signal presence detector (SPD) 780 having a blockage-prediction filter to mitigate the effects of signal loss on the signal acquisition and tracking loops 790. In some embodiments, SPD 780 detects the presence of the forward link signal and interruptions of the forward link signal. Blockage prediction filter uses input from SPD 780 to estimate the arrival and duration of a blockage event.

As shown, demodulator 770, signal presence detector 780, and tracking loops 790 are arranged in a loop. In some embodiments, based upon the estimates of its blockage-predication filter, SPD 780 disables error detector feedback within the receiver's carrier-phase, symbol-phase and automatic gain control loops. Thus, for example, immediately before a predicted blockage occurs, SPD 780 causes receiver 760 to operate in a temporary open-loop condition. This is called "fly-wheeling" tracking-loops 790 through the outage and it avoids the effect of injecting noise-only error detector values into the parameter tracking loops. Otherwise, in some cases, noise-only input can be so detrimental as to prevent proper reacquisition when the forward link signal reappears. Also, as shown, SPD 780 also generates a return link transmit control signal. As discussed below, the return link transmit control signal may be used to enable/disable return link transmissions based upon blockage conditions.

During temporary open-loop operation, SPD 780 marks bits from demodulator 770 as erasures. This is accomplished, in the embodiment shown, by alerting a marking engine 800 that bits received from the demodulator 770 are erasures. Marking erasures has the beneficial effect of improving the capability of FEC decoder 810 to identify and correct bit errors. FEC decoder 810 outputs a decoded bit stream to transport processor 820 which frames the data into packets and ensures the correct temporal order of the packets provided to the system for processing. In this manner, receiver 760 uses information about upcoming blockage events control tracking loops 790 and thereby minimize link loss.

Focusing again on the return link, it can be desirable to have local control over transmit timing. This is particularly true in the case of obstructed terminals where, for example, data presented to a modem can be transmitted without having first to ask for bandwidth allocation and then to wait for its assignment by a central bandwidth manager. One approach to locally controlling the return link transmit signal is to form an estimate based upon channel blockage characteristics and to use the estimate to determine when data can be transmitted and when data transmission should be suspended. The following discussion assumes an estimate is generated at the obstructed mobile platform. In general, however, the estimate could also be made at the gateway.

In various embodiments of the present invention, a signal presence detector is used to predict the occurrence of a blockage event. At a mobile terminal, for example, an SPD circuit (such as SPD 780) can serve two purposes. First, the SPD can be used to "freeze" tracking loops during a blockage event thereby minimizing link loss. As used herein, "freeze" essentially means to hold or stop a tracking loop during a blockage at or near the place the loop was in at the beginning of the blockage. The loop may thus be resumed at or near the end of the blockage, without the disruption of restarting the loops. This allows the loop to be placed on hold, or frozen, during the blockage. This was discussed in connection with forward link erasure marking. Second, the SPD can be used to control the timing of return link transmissions by signaling open transmit times.

To control return link transmission, an estimate of blockage characteristics can be formed based upon information from the SPD. For example, the SPD can detect when blade rotation starts and stops in a helicopter-based terminal. Initial values of blockage period and blockage duration parameters can be established based upon signal strength measurements. When operating conditions change, the SPD can dynamically adapt. For example, as a helicopter turns and the blade-obstruction profile changes, the blockage fade depth and duration can also change significantly. The SPD can be configured to respond to these changes automatically by adjusting a signal presence/absence threshold to stay near an optimal level. This, in turn, can feedback into the blockage predication determination and can be used to update and improve the estimate of blockage characteristics.

The blockage estimate can be advantageously used to form "dynamic guard windows" around predicted blockage times at an obstructed terminal. The dynamic guard windows provide lead time before a predicted blockage occurs and lag time after it passes. During the interval defined by the guard windows, return link transmission is suspended. The guard windows function in the presence of changing conditions such as helicopter dynamics or rotor speed to enable tracking algorithms to operate reliably in the presence of such outages. Return link data generated during an outage can be stored in a buffer and subsequently transmitted outside of the guard/suspended interval.

In one embodiment, the return link transmit data stream is suspended one lead time before a predicted blockage and resumes one lag time after the end of the blockage is detected. The lead and lag intervals can be defined in relation to a data rate of the communication system. For example, the lead time may be established to permit transmission of a burst to be completed before the expected arrival of the periodic blockage. Thus, a relatively long lead time may be needed to complete burst transmission at low data-rates and a relatively short lead time may be needed to complete burst transmission at high data-rates. Lag time, on the other hand, may be established based upon the time required for tracking loops 790 to reacquire the forward link signal after the blockage has passed.

Figure 8:
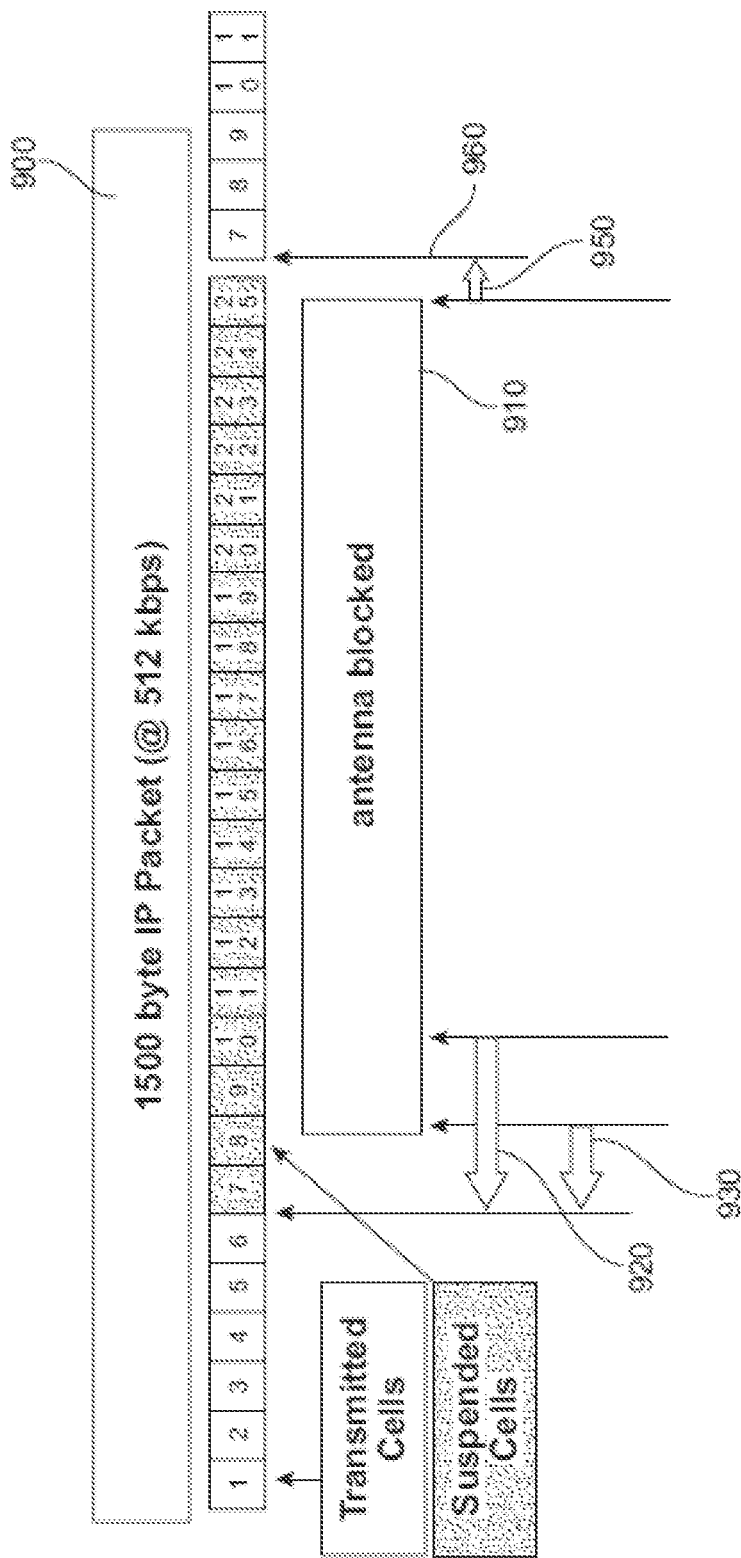
FIG. 8 is a diagram illustrating return link processing in accordance with embodiments of the present invention.

FIG. 8 is a diagram depicting an antenna blockage event according to one embodiment of the present invention. As shown, a 1,500 byte IP packet 900 is to be transmitted from an obstructed terminal at a data rate of 512 kbps. The packet is divided into 53-byte cells for over-the-air transmission. For purposes of illustration, some of these cells (1, 2, . . . 25) are shown below packet 900.

As packet 900 is being transmitted, an antenna blockage event 910 occurs midway through transmission of cell 8. Two possible outage detection lead times are shown—a relatively long lead time 920 corresponding to channel rate of 1 Mbps, and a relatively short lead time 930 corresponding to a channel rate of 10 Mbps. The relatively longer lead time 920 of the 1 Mbps signal provides more time to complete the 1 Mbps transmission and for the tracking algorithm to reliably track the outage window. A lagging guard window is also established at the end of blockage event 910 as shown by element 950 and defines the point 960 at which transmission of packet data on the return link is restarted.

In operation, the SPD may accurately predict that blockage event 910 will occur sometime during the transmission of cells 8-10. A lead/lag time can then be determined for the predicted blockage using the estimated blockage duration and the appropriate channel data rate. The lead/lag times thus establish dynamic guard windows around the predicted outage which help to compensate for processing delays that may be incurred during detection of the outage and provide adequate time to transmit one or more pending cells before the blockage arrives. In the figure, the lead time is show as starting with the arrival of cell 7 of packet 900. However, it will be appreciated that lead/lag time values are dynamic and can change based upon operating conditions such as if the blockage duration or channel bit rate changes.

During the blockage, the return link data steam is suspended. Cells generated during the suspended period may be placed into a buffer and maintained for the duration of the outage. Thus, as shown, cells 7-25 are suspended throughout blockage event 910. Depending upon the implementation, cells which fall within the applicable guard windows may or may not be transmitted. Once the end of the blockage is detected (with an appropriate guard period), the transmission of the suspended cells will resume. Accordingly, transmission of packet 900 resumes with cell 7, following lagging guard window 950 at the tail end of the obstruction.

Figure 9:
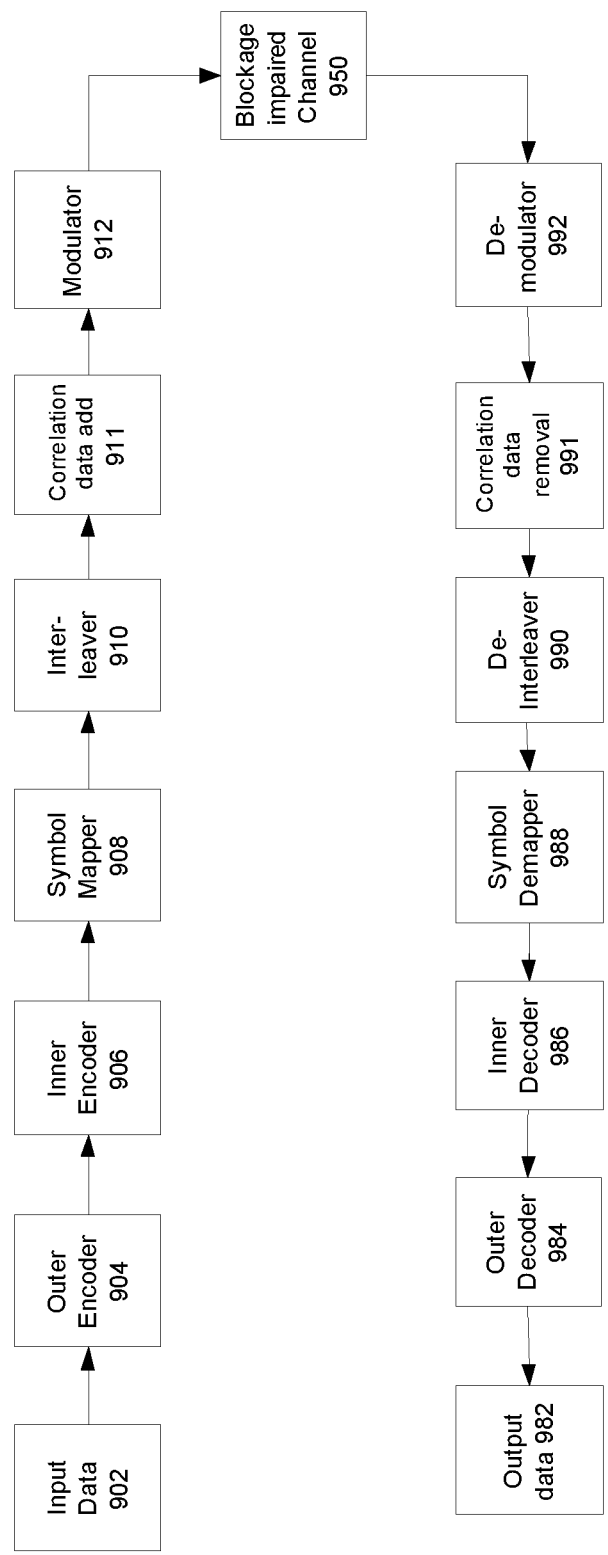
FIG. 9 is a block diagram of a system for communication over a blockage impaired channel in accordance with embodiments of the present invention.

FIG. 9 describes one potential alternative embodiment. The system of FIG. 9 includes input data module 902, outer encoder 904, inner encoder 906, symbol mapper 908, interleaver 910, correlation data add module 911, modulator 912, a blockage impaired data channel 950, demodulator 992, correlation data removal module 991, deinterleaver 990, symbol demapper 988, inner decoder 986, outer decoder 984, and output data module 982.

Input data module 902 may comprise any computing system which may deliver data to a communication system as described here. Outer encoder 904 and inner encoder 906 may both function as encoders to encode data for different purposes. In alternative examples, more or fewer encoders may be used to optimize encoded data to be transmitted across a blockage impaired channel 950. Symbol mapper 908 may also be referred to as a spreader, and may function to convert bits into chips. Interleaver 910 may then function to break up potential long strings of 1 or 0 chips by sorting or randomizing chips in a known fashion. Data correlation module 911 may add additional data into a string of chips for the purposes of data stream matching as further described below. Modulator 912 may output data to the blockage impaired channel 950. There receiver side then performs the inverted action of the corresponding module on the receiver side. Demodulator 992 may receive the data from the blockage impaired channel 950, correlation data removal module may remove added data and identify blockages as further described below, deinterleaver 990 may reverse the randomizing process implemented by interleaver 910, symbol demapper 988 may convert the received chips into appropriate bits, inner and outer decoders 984 and 986 may decode the data to undo the encoding of encoders 904 and 906, and the data may then be output to an appropriate computing system via output data module 982.

Thus, in the above described system, input data stream may flow through an outer encoder and an inner encoder, the constructed encoded bit streams may then be mapped to I/Q symbols, which may be further spreaded into I/Q chips if needed. The I/Q symbols/chips may then be interleaved, and correlation data added, before the signals are frequency modulated and passed onto a satellite channel where blockage may impact the RF signal. The receive side may frequency demodulate the signals from the satellite channel, and deinterleaves the I/Q symbols/chips to recover the original symbol/chip stream. If the spreading is used on the transmit side, then the resultant chip stream may be despreaded into a symbol stream, which is further demapped into a bit stream. The bit stream is decoded via inner and outer decoders to recover any bit errors encountered, and may thus create the output data stream.

In certain embodiments, interleaver 910 and deinterleaver 990 may modify data in a transmission channel to disperse potentially large blocks of contiguous data corrupted during the blockage into more distributed and small chunks of bit errors. In certain embodiments, distributed errors may be more readily identifiable and correctable by certain decoders. The interleaver/de-interleaver modules may thus mitigate the effect of blockages that would otherwise corrupt large blocks of contiguous data.

Figure 10:
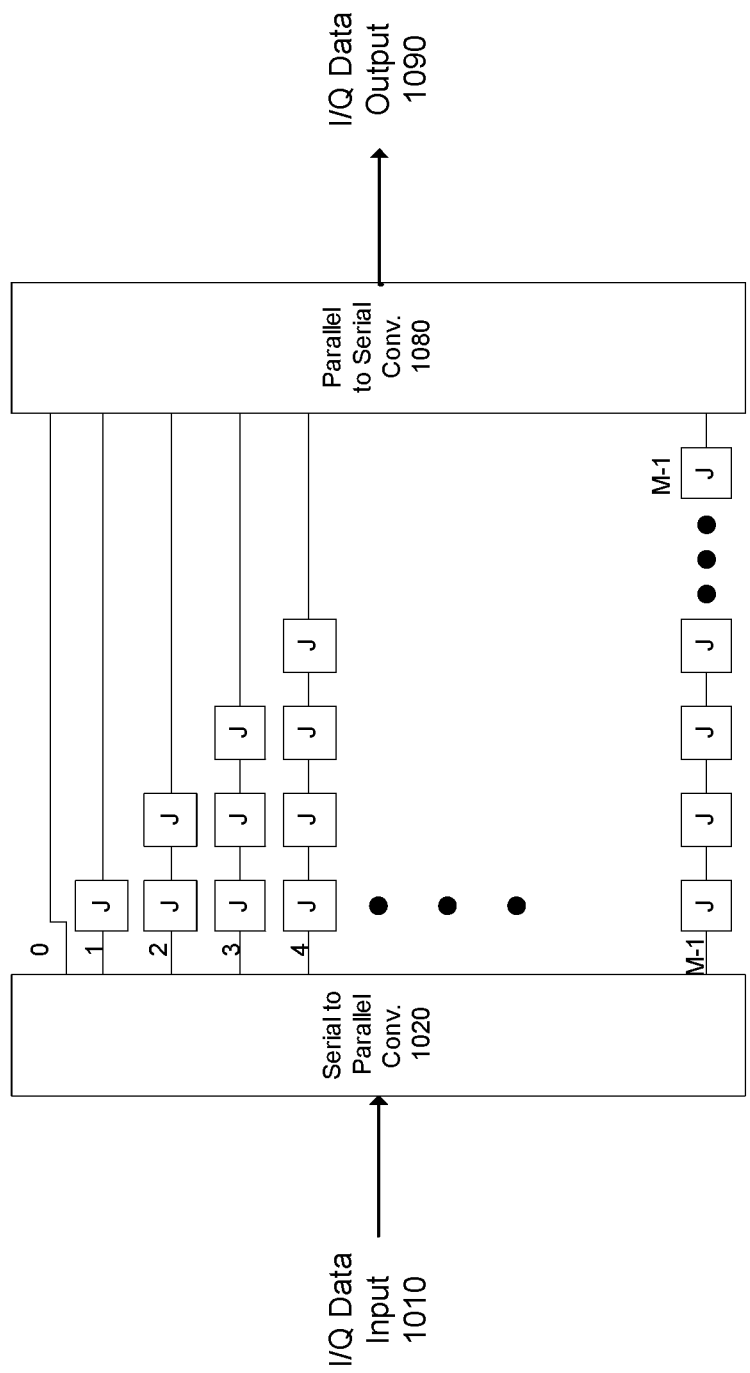
FIG. 10 is a block diagram of an interleaver for communication over a blockage impaired channel in accordance with embodiments of the present invention.
Figure 11:
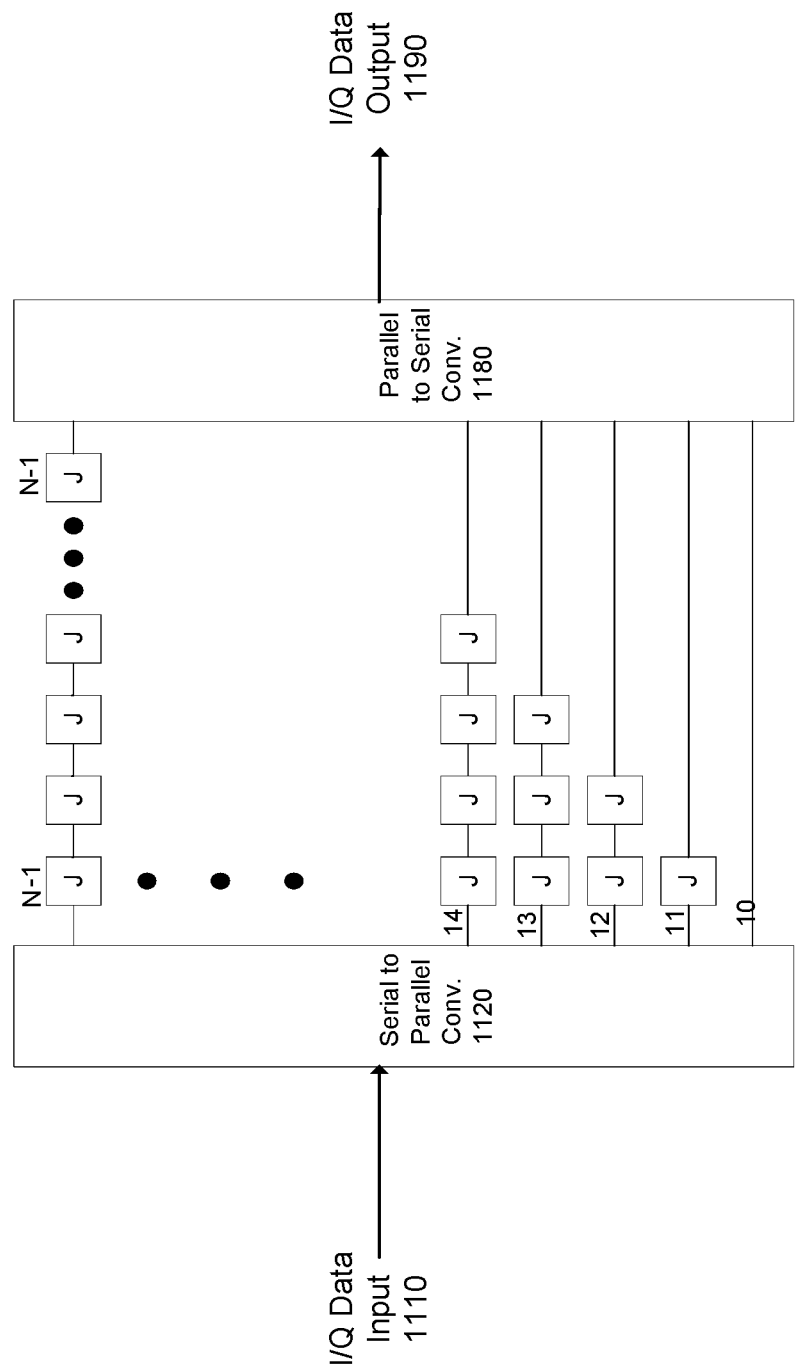
FIG. 11 is a block diagram of a deinterleaver for communication over a blockage impaired channel in accordance with embodiments of the present invention.

A convolutional interleaver is one potential embodiment of an interleaver that may be used on the transmit side and a convolutional deinterleaver may be used on the receive side. FIGS. 10 and 11 therefore show one potential embodiment of an interleaver and deinterleaver in accordance with one embodiment. FIG. 10 shows data input 1010, data output 1090, serial to parallel converter 1020, parallel to serial converter 1080, and delay lines 0 through M−1. While FIG. 1 shows an implementation with M delay lines for systems having M-chips in a block of data, other embodiments may have any number of delay lines or chips per block. In FIG. 10, Each M-chip block of serial data input to the interleaver is output in parallel to the branches 1 through M−1. Each branch has a different delay attached to it. In the diagram, J is the delay unit, and making (M−1)*J the longest delay line/branch. Following the branch structure, the $0^{th}$ chip goes straight through to the parallel to serial block on delay line 0, the $1^{st}$ incurs a J length delay, and so on, with the $(M-1)^{th}$ branch incurring a J*(M−1) delay. Hence, at a given time, a shuffled set of M chips arrive at the parallel to serial converter 1080. Here, these chips are serialized and output at data output 1080 as part of the interleaved frame.

Both the size of the block and the delay may be defined by an interleaver register. This register may be programmable by software and may be defined as a part of setup for the receiver. Distinct pairs of block size and delay may be used for the corresponding end-to-end delay setting.

The deinterleaver structure of FIG. 11 is only different from the interleaver structure of FIG. 10 in that the order of the branch delay lines is reversed to guarantee that a fixed delay of (M−1)*J is achieved on all branches after the interleaver and the deinterleaver operations. FIG. 11 shows data input 1110, data output 1190, serial to parallel converter 1120, parallel to serial converter 1180, and delay lines 10 through N−1. The number of delay lines in the interleaver may be set to match the number of lines in the deinterleaver, but any number of delay lines may be used as long as the deinterleaver along with any additional structure functions to undo the process of the interleaver.

Just as in the system describe above in FIG. 7, the system of FIG. 9 may additionally function to improve communication by detecting blockages in channel 950. Such detection may be based on a power anomaly detection method, a data-aided correlation amplitude thresholding method, or any other method. The system of FIG. 9 uses a power amplitude thresholding method implemented using data correlation modules 911 and 991. In the data-aided correlation amplitude thresholding method, known data patterns, which may be referred to as unique identifiers, may be inserted periodically into the interleaved chip stream on the transmit side by correlation data add module 911, and the receiver correlates the incoming chip stream at the unique identifier positions with the local copy of the unique identifiers and evaluates the correlation amplitude when the unique identifiers are received by correlation data removal module 991. In certain embodiments, when the receiver is in tracking state, the correlation value may be consistently above a programmable threshold unless the signal is blocked, and thus the correlation value dips through the threshold marks at the start of a blockage and recovers to over the threshold marks the end of the blockage. The blockage may thus be identified by a low correlation value for the unique identifiers received at the correlation data removal module 991 compared with the expected unique identifier which is known to be incoming.

The correlation over the identifier length window as produced by the phase error detector of the carrier phase loop may also be used to an early and raw indicator of the signal strength, given that the carrier phase loop is in the tracking mode now and the residual phase error may be small. As a result, in the tracking mode, the data-aided correlation may have a large positive value on an I channel and small value on a Q channel when the signal is present. However, during the blockage when the identifier signal is blocked, noises are fed into the phase error detector, the correlation should result in small values on both I and Q channel.

Correlation data removal module 991 may create a raw low signal flag in a data tracking mode whenever the larger amplitude on the correlator output is less than a configurable threshold. In certain embodiments, this flag may be sent through a simple filter, and a signal blockage indicated when the low signal flag occurs at least a certain number of consecutive times. The signal blockage or absence indicator may then be used to zero data in correlation data removal module 991 and the zero data passed to de-interleaver 990. The zero data may then be de-interleaved with the received unblocked data, and the errors introduced by the zeros corrected by decoders 984 and 982.

In certain embodiments, a demodulator 992 may have an acquisition mode that may put the demodulator 992 on hold for a significant amount of time, during which all the data is lost. In order to maintain an effective data link during the blockage, the system may function to avoid a decoder signal acquisition process. During some long blockages however, a demodulator 992 may lose a lock and may force an acquisition mode. In certain embodiments, therefore, large timeout timer may be set in a demodulator tracking state for the blockage applications so that it will stay in tracking state for at a certain amount of time even if the signal is unlocked. In other words, when demodulator 992 loses signal tracking, a delay may be implemented to prevent demodulator 992 from entering an acquisition mode. In certain embodiments, an acquisition mode may put the decoder on hold for up to 250 ms, and a 50 ms timeout timer may be sufficient to allow correlation data removal module to identify a blockage before a demodulator 992 enters an acquisition mode. The correlation data removal module 991 may then freeze the demodulator 992 tracking to further prevent entry into an acquisition mode and corresponding data loss.

To ensure the demodulator 992 stays in the tracking state, correlation data removal module 991 may thus intervene in the carrier phase loop, the time tracking loop, and the power tracking loop so that they would not drift away due to bad samples during the blockage, and this can be accomplished by zeroing both the phase error detector output, chip error detector output, and power detector output when correlation data removal module 991 identifies a blockage and outputs a signal blockage or signal absence indicator.

In certain embodiments, receiver software may set a modcode mask based on an averaged signal, and a blockage may cause this average to fluctuate significantly, which in turn may cause the modcode mask to change drastically. This may result in a frame not being detected and demoded with the right modcode during incorrectly blockage. In certain embodiments, this may be resolved measuring signal strength data supplied to the receiver software, and a flag may be set whenever a signal absence is indicated by correlation data removal module 991 during a signal accumulation window. The receiver software then uses this flag to exclude any estimate that has used the tagged signal strength data samples, and thus keeps the averaged signal above the same average with the blockage. With this scheme, the average signal estimate may not alter and may have a same distribution as without the blockage.

Further, correlation data removal module 991 may intervene in an automatic gain control (AGC) loop during a blockage. The AGC loop may be driven to a wrong set point due to the blocked signals, and an AGC loop intervention freezing the AGC based on the signal absence indicator may function to combat this effect.

As described above, the detection of signal absence may be used to avoid signal loss, demodulator acquisition modes, and loop failure in a receiver. In alternative embodiments, as described above, a power anomaly detection method may be used. In such a power anomaly detection method, a system may integrate I/Q chip power measurements, and use the power anomaly corresponding to significant power increases after blockage and power decreases during blockage to mark the start and the end of a blockage.

The present invention can be implemented in digital electronic circuitry, or in combinations of computer hardware, firmware, and software. An apparatus according to the invention can be implemented in a computer program product tangibly embodied in a machine-readable storage device for execution by a programmable processor as a program of instructions for performing functions of the invention by operating on input data and generating output.

The present invention has many applications. In describing an embodiment of a satellite communication system according to the present invention, only a few of the possible variations are described. Other applications and variations will be apparent to one of ordinary skill in the art, so the invention should not be construed as narrowly as the examples, but rather in accordance with the appended claims.

What is claimed is:

1. A method comprising:
   establishing a communication session with a terminal via an intermittently obstructed channel in a wireless communication system;
   identifying blockage characteristics associated with the intermittently obstructed channel;
   determining communication parameters for communication with the terminal via the intermittently obstructed channel based on the blockage characteristics;
   communicating first data signals of the communication session with the terminal via the intermittently obstructed channel according to the communication parameters;
   identifying a change in the blockage characteristics;
   updating the communication parameters based on the identified change in the blockage characteristics; and
   communicating second data signals of the communication session with the terminal via the intermittently obstructed channel according to the updated communication parameters.

2. The method of claim 1, wherein the communication parameters comprise a time diversity delay value for transmission of a duplicate packet after transmission of an original packet.

3. The method of claim 2, wherein the communicating the first and second data signals comprises:
   performing time-diversity processing for the first and second data signals at an Internet Protocol layer based on the time diversity delay value.

4. The method of claim 2, wherein the communicating the first and second data signals comprises:
   performing time-diversity processing for the first and second data signals at a transport layer based on the time diversity delay value.

5. The method of claim 1, wherein the communication parameters comprise at least one of a minimum time diversity delay value or a maximum time diversity delay vale for transmission of a duplicate packet after transmission of an original packet.

6. The method of claim 1, wherein the identifying the change in the blockage characteristics is based on monitoring at least one of burst arrivals, burst timing, packet counts.

7. The method of claim 1, wherein the identifying the change in the blockage characteristics comprises receiving updated blockage information from the terminal.

8. The method of claim 1, wherein the communication parameters comprise a packet time for transmission of packets to the terminal via the intermittently obstructed channel.

9. The method of claim 1, wherein the blockage characteristics comprise at least one of a blockage period or a blockage duration.

10. An apparatus for wireless communication with a terminal via an intermittently obstructed channel in a wireless communication system, comprising:
    a transport processor that identifies blockage characteristics associated with the intermittently obstructed channel for a communication session with the terminal;
    a scheduler that determines communication parameters for communication with the terminal via the intermittently obstructed channel based on the blockage characteristics; and
    a buffer that controls communication of first data signals of the communication session with the terminal via the intermittently obstructed channel according to the communication parameters,
    wherein:
       the transport processor identifies a change in the blockage characteristics;
       the scheduler updates the communication parameters based on the identified change in the blockage characteristics; and
       the buffer controls communication of second data signals of the communication session with the terminal via the intermittently obstructed channel according to the updated communication parameters.

11. The apparatus of claim 10, wherein the communication parameters comprise a time diversity delay value for transmission of a duplicate packet after transmission of an original packet.

12. The apparatus of claim 11, wherein the buffer performs time-diversity processing for the first and second data signals at an Internet Protocol layer based on the time diversity delay value.

13. The apparatus of claim 11, wherein the buffer performs time-diversity processing for the first and second data signals at a transport layer based on the time diversity delay value.

14. The apparatus of claim 10, wherein the communication parameters comprise at least one of a minimum time diversity delay value or a maximum time diversity delay vale for transmission of a duplicate packet after transmission of an original packet.

15. The apparatus of claim 1, wherein the transport processor is configured identify the change in the blockage characteristics based on monitoring at least one of burst arrivals, burst timing, packet counts.

16. The apparatus of claim 10, wherein the transport processor is configured to identify the change in the blockage characteristics based on receiving updated blockage information from the terminal.

17. The apparatus of claim 10, wherein the communication parameters comprise a packet time for transmission of packets to the terminal via the intermittently obstructed channel.

18. The apparatus of claim 10, wherein the blockage characteristics comprise at least one of a blockage period or a blockage duration.

19. A non-transitory computer-readable medium for wireless communication in a wireless communication system, the non-transitory computer-readable medium comprising instructions which, when executed by a processor, cause the processor to:
    establish a communication session with a terminal via an intermittently obstructed channel;
    identify blockage characteristics associated with the intermittently obstructed channel;
    determine communication parameters for communication with the terminal via the intermittently obstructed channel based on the blockage characteristics;

communicate first data signals of the communication session with the terminal via the intermittently obstructed channel according to the communication parameters;
identify a change in the blockage characteristics;
update the communication parameters based on the identified change in the blockage characteristics; and
communicate second data signals of the communication session with the terminal via the intermittently obstructed channel according to the updated communication parameters.

* * * * *